United States Patent
Xie et al.

(10) Patent No.: US 8,989,738 B2
(45) Date of Patent: Mar. 24, 2015

(54) METHOD FOR ENABLING AN MSS TO ENTER AN IDLE MODE IN A WIRELESS METROPOLITAN AREA NETWORK BY A NETWORK SIDE

(75) Inventors: Yong Xie, Chengdu (CN); Jianjun Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 13/462,235

(22) Filed: May 2, 2012

(65) Prior Publication Data

US 2012/0214487 A1    Aug. 23, 2012

Related U.S. Application Data

(63) Continuation of application No. 12/260,717, filed on Oct. 29, 2008, now Pat. No. 8,194,577, which is a continuation of application No. PCT/CN2007/001484, filed on Apr. 30, 2007.

(30) Foreign Application Priority Data

Apr. 30, 2006   (CN) .......................... 2006 1 0075196
Jun. 19, 2006   (CN) .......................... 2006 1 0094437

(51) Int. Cl.
    *H04W 4/00*      (2009.01)
    *H04W 60/00*    (2009.01)

(52) U.S. Cl.
    CPC ..................................... *H04W 60/00* (2013.01)
    USPC ................... 455/435.1; 455/528; 455/127.5; 455/574

(58) Field of Classification Search
    CPC ..... H04W 60/00; H04W 52/02; H04W 60/06; Y02B 60/50
    See application file for complete search history.

(56) References Cited

U.S. PATENT DOCUMENTS

| | | | |
|---|---|---|---|
| 5,926,469 | A | 7/1999 | Norstedt et al. |
| 6,161,006 | A | 12/2000 | Balachandran |

(Continued)

FOREIGN PATENT DOCUMENTS

| | | |
|---|---|---|
| CN | 1507190 A | 6/2004 |
| CN | 101282270 A | 10/2008 |

(Continued)

OTHER PUBLICATIONS

Rejection Decision in corresponding Chinese Patent Application No. 200610094437.1 (Jul. 10, 2012).

(Continued)

*Primary Examiner* — Olumide T Ajibade Akonai
*Assistant Examiner* — Edward Zhang
(74) *Attorney, Agent, or Firm* — Leydig, Voit & Mayer, Ltd

(57) ABSTRACT

The present invention provides a method as regards how a network side gets a MSS into the idle mode in a wireless MAN, including: the PA/BS sends a DREG_CMD to the MSS; the MSS sends a DREG_REQ message to the PA/BS, according to the DREG_CMD message, requesting to enter the idle mode; the PA/BS releases the link of the MSS and updates the data of the anchor PC/LR after receiving the DREG_REQ message. The present invention specifies the process of a MSS entering the idle mode initiated by the network and the settings of relevant parameters, thus enhancing the stability of the process of entering the idle mode and saving the system resources.

13 Claims, 6 Drawing Sheets

(56) References Cited

U.S. PATENT DOCUMENTS

| | | | |
|---|---|---|---|
| 6,370,390 | B1 | 4/2002 | Salin et al. |
| 6,967,927 | B1 | 11/2005 | Dugeon et al. |
| 7,142,520 | B1 | 11/2006 | Haverinen et al. |
| 7,590,421 | B2 | 9/2009 | Ryu et al. |
| 2001/0002920 | A1 | 6/2001 | Kanazumi et al. |
| 2002/0082018 | A1 | 6/2002 | Coskun et al. |
| 2002/0086682 | A1 | 7/2002 | Naghian |
| 2002/0197998 | A1 | 12/2002 | Schmidt |
| 2003/0130008 | A1 | 7/2003 | Rajaniemi et al. |
| 2004/0008679 | A1 | 1/2004 | Sinnarajah et al. |
| 2004/0266426 | A1 | 12/2004 | Marsh et al. |
| 2005/0185623 | A1 | 8/2005 | Ray et al. |
| 2005/0207396 | A1 | 9/2005 | Vaittinen et al. |
| 2005/0271055 | A1 | 12/2005 | Stupka |
| 2005/0272481 | A1 | 12/2005 | Kim |
| 2005/0288049 | A1 | 12/2005 | Gill et al. |
| 2006/0009241 | A1* | 1/2006 | Ryu et al. ............ 455/458 |
| 2006/0025134 | A1 | 2/2006 | Cho et al. |
| 2006/0203766 | A1* | 9/2006 | Kim et al. ............ 370/328 |
| 2006/0281466 | A1* | 12/2006 | Gholmieh et al. ...... 455/450 |
| 2007/0105567 | A1* | 5/2007 | Mohanty et al. ....... 455/458 |
| 2007/0191031 | A1 | 8/2007 | Mohanty et al. |

FOREIGN PATENT DOCUMENTS

| | | |
|---|---|---|
| WO | WO 9839940 A2 | 9/1998 |
| WO | WO 0197549 A1 | 12/2001 |
| WO | WO 2005120178 A2 | 12/2005 |
| WO | WO 2005120181 A2 | 12/2005 |
| WO | WO 2006016766 A2 | 2/2006 |

OTHER PUBLICATIONS

Notification of Reexamination in corresponding Chinese Patent Application No. 200610094437.1 (Apr. 27, 2013).
Rejection Decision in corresponding Chinese Patent Application No. 200810082405.9 (Nov. 4, 2011).
Image File Wrapper in corresponding U.S. Appl. No. 12/347,544 (Sep. 15, 2011).
Written Opinion of the International Searching Authority in corresponding PCT Application No. PCT/CN2007/001484 (Aug. 9, 2007).
International Search Report in corresponding PCT Application No. PCT/CN2007/001484 (Aug. 9, 2007).
$1^{st}$ Office Action in related Chinese Application No. 200810082405.9 (May 5, 2010).
$1^{st}$ Office Action in corresponding Chinese Application No. 200610094437.1 (May 20, 2010).
$2^{nd}$ Office Action in corresponding Chinese Application No. 200610094437.1 (Nov. 3, 2011).
"Stage 3: Detailed Protocols and Procedures," WiMAX Forum Network Architecture, Mar. 28, 2007, Release 1.0.0, Beaverton, Oregon.
IEEE, "Part 16: Air Interface for Fixed and Mobile Broadband Wireless Access Systems Amendment 2: Physical and Medium Access Control Layers for Combined Fixed and Mobile Operation in Licensed Bands and Corrigendum 1," IEEE Standard for Local and Metropolitan Area Networks, IEEE Std 802.16e-2005 and IEEE Std 802.16/2004/Cor1-2005, 1-822 (Feb. 28, 2006).

* cited by examiner

METHOD FOR ENABLING AN MSS TO ENTER AN IDLE MODE IN A WIRELESS METROPOLITAN AREA NETWORK BY A NETWORK SIDE

CROSS-REFERENCE TO RELATED APPLICATIONS

This application is a continuation of U.S. patent application Ser. No. 12/260,717, filed on Oct. 29, 2008, which is a continuation of International Application No. PCT/CN2007/001484, filed on Apr. 30, 2007. The International Application claims priority to Chinese Patent Application No. 200610075196.6, filed on Apr. 30, 2006, and Chinese Patent Application No. 200610094437.1, filed on Jun. 19, 2006, all of which are hereby incorporated by reference in their entirety.

FIELD OF THE INVENTION

The present invention relates to the wireless Metropolitan Area Network (MAN) technology, and in particular, to a method for a network side to enable a Mobile Station System (MSS) to enter the idle mode in a wireless MAN.

BACKGROUND

The idle mode is a working mode of a terminal in a mobile broadband Radio Access System (RAS). In the idle mode, a MSS can move in a set area, and receive the downlink broadcast service messages at regular intervals. The downlink broadcast service messages are designed to notify the MSS whether any downlink service needs to be transmitted. While roaming in an area, a MSS does not need to get registered on the Basestation (BS) of the cell where the MSS is roaming. Meanwhile, while roaming in different cells, the MSS does not need to perform normal operation processes, such as handover, which is conducive to saving MSS power and air interface resources.

Multiple BSs make up a group, called Paging Group (PG). A PG is intended to constitute a continuous area, inside which the MSS does not need to send uplink services but can use downlink paging channels to judge whether any downlink service is sent to the MSS. On one hand, a PG must be large enough to ensure that most MSSs are kept in the same PG in a long time; on the other hand, a PG must be small enough to ensure that the overhead spent by the PG for paging a MSS is reasonable.

In the normal operation process on a Serving BS (SBS), the MSS may request to enter the idle mode by sending a message. Likewise, a serving BS may require an MSS to enter the idle mode by sending a message. No matter whether the MSS requests to enter the idle mode through a message or the serving BS requires the MSS to enter the idle mode through a message, the MSS must finish deregistration and enter the idle mode within the specified time.

The Worldwide Interoperability for Microwave Access (WiMAX) standard currently under development defines a paging reference model in the idle mode, in which the Paging Controller (PC) is a network entity that controls the activities of a MSS in the idle mode. The PC is a logic entity in the current WiMAX network architecture. Since a PC needs to send paging messages according to the PG that currently contains the MSS, a Location Register (LR) is required for storing the state information, paging information and service flow information of the MSS. Generally, each LR logic entity corresponds to one PC logic entity, and the two logic entities work in the same physical Network Element (NE). PCs can be divided into the following two types: (i) anchor PC: each MSS in the idle mode uniquely corresponds to an anchor PC which controls the actions of the MSS in the idle mode and controls the relevant processes; (ii) relay PC: one idle MSS may have one or more relay PCs for communicating with the anchor PC. For different MSSs, a PC may act as both anchor PC and relay PC.

Generally, a Paging Agent (PA) located in a BS is designed to handle paging and the functions related to the idle mode.

Regardless of other physical Network Elements (NEs) and logic entities in the WiMAX network, the following description is made with respect to the WiMAX paging reference model shown in FIG. 1 (the technical solution under the present invention includes but is not limited to the application in a WiMAX system).

According to the paging reference model shown in FIG. 1, when a MSS requests to enter the idle mode on the SBS, or the SBS instructs the MSS to enter the idle mode, message interaction will be performed between the MSS and SBS and between the SBS and the back-end NE "ASN GW" to notify the PC that the MSS enters the idle mode (this is implemented in the Access Service Network Gateway (ASN GW)). The state information, paging information, and service flow information of the MSS are saved in the corresponding LR.

FIG. 2 shows the process of entering the idle mode initiated by a MSS. The detailed procedure is as follows:

(1) The MSS sends a deregistration request (DREG_REQ) to the PA/DPF (or

PA/SBS for the reason that DPF is located in the SBS);

(2)-(3) The local PC receives the DREG_REQ, specifies an anchor PC for the MSS, allocates paging parameters for the MSS to enter the idle mode, and then returns such information to the serving PA through a MSS Dreg Rsp message;

(4)-(5) The serving PA uses the functions of its Data Path Function (DPF) entity to send a data path release request (Data Path Rel Req) to the relay DPF on the MSS link, in order to release the link on the MSS. The relay DPF on the link forwards the Data Path Rel Req to the anchor DPF;

(6) The anchor DPF sends a MSS information request (MSS Info Req) message to the anchor PC specified in the Data Path Rel Req message;

(7) After receiving the MSS Info Req, the anchor PC contacts the anchor authenticator to verify whether to allow the MSS to enter the idle mode, and replies with a MSS Info Rsp to the anchor DPF;

(8) According to the MSS Info Rsp, the anchor DPF sends a Data Path Rel Rsp to the relay DPF if the MSS is allowed to enter the idle mode;

(9) The relay DPF sends a Data Path Rel Rsp message to the serving PA/DPF; and

(10) After receiving the Data Path Rel Rsp, the PA/DPF confirms that the MSS enters the idle mode successfully, and sends, from the air interface, a deregistration command (DREG_CMD) message to the MSS, thus finishing the process of entering the idle mode.

However, the inventor discovered that the prior art has defects about the process of entering the idle mode initiated by the network; the prior art does not specify the process of the MSS entering the idle mode initiated by the network, which impairs the stability of the process of entering the idle mode.

The invention also discovered that the prior art does not consider another circumstance of entering the idle mode initiated by the network: when the network initiates the process of entering the idle mode, the network cannot enable the MSS to enter the idle mode unless the MSS sends a request of entering the idle mode after a delay of REQ-duration. Moreover, when the network requires the MSS to enter the idle mode, the MSS may require a delay for its own reasons before entering the idle mode.

SUMMARY

The present invention provides a method for a network side to enable a MSS to enter the idle mode in a wireless MAN.

A method for a network side to enable a MSS to enter the idle mode in a wireless MAN includes:

sending, by a PA/BS, a DREG_CMD message to the MSS;

receiving, by the PA/BS, a DREG_REQ message from the MSS, requesting to enter the idle mode; and releasing, by the PA/BS, the link of the MSS and updating the data of the anchor PC/LR after receiving the DREG_REQ message.

The present invention specifies the process of a MSS entering the idle mode initiated by the network and the settings of relevant parameters, thus enhancing the stability of the process of entering the idle mode and saving the system resources.

DETAILED DESCRIPTION

The present invention supports two types of processes in which a network side enables a MSS to enter the idle mode:

i. when the network side sends a request of getting the MSS into the idle mode, the network entity enables the MSS to enter the idle mode directly without delay; and ii. when the network side sends a request of enabling the MSS to enter the idle mode, the network entity requires the MSS to wait for a period of time before entering the idle mode.

Moreover, the present invention specifies another scenario. For example, if multiple hosts are attached to a MSS, the MSS may need a period of time of waiting before entering the idle mode due to interaction with the host, when the network is initialized to get the MSS into the idle mode. The present invention is hereinafter described in detail with reference to the embodiments in different scenarios.

Figure 1:
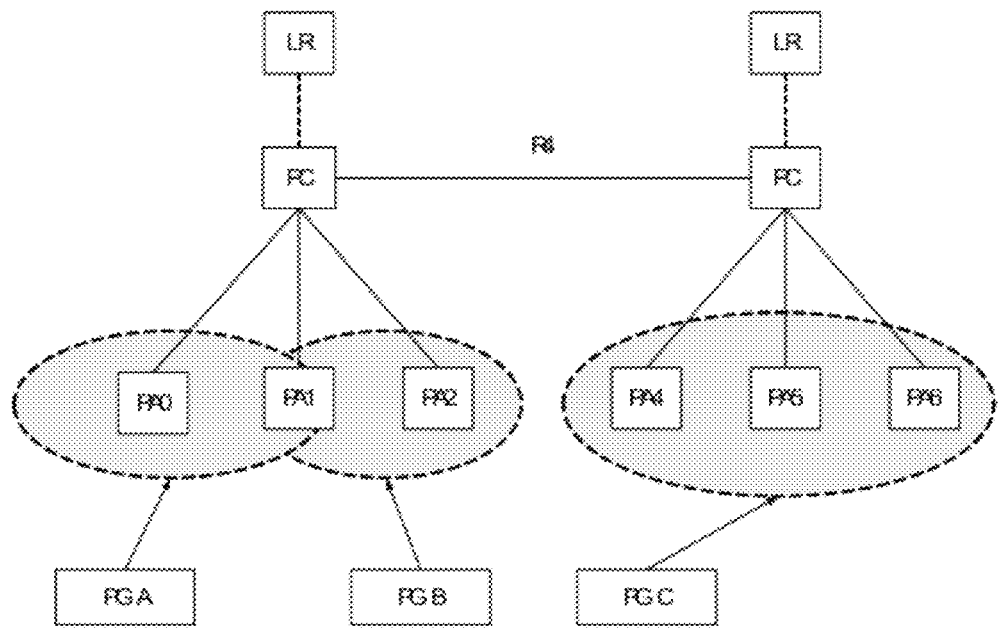
FIG. 1 shows a paging reference model of a WiMAX system.
Figure 2:
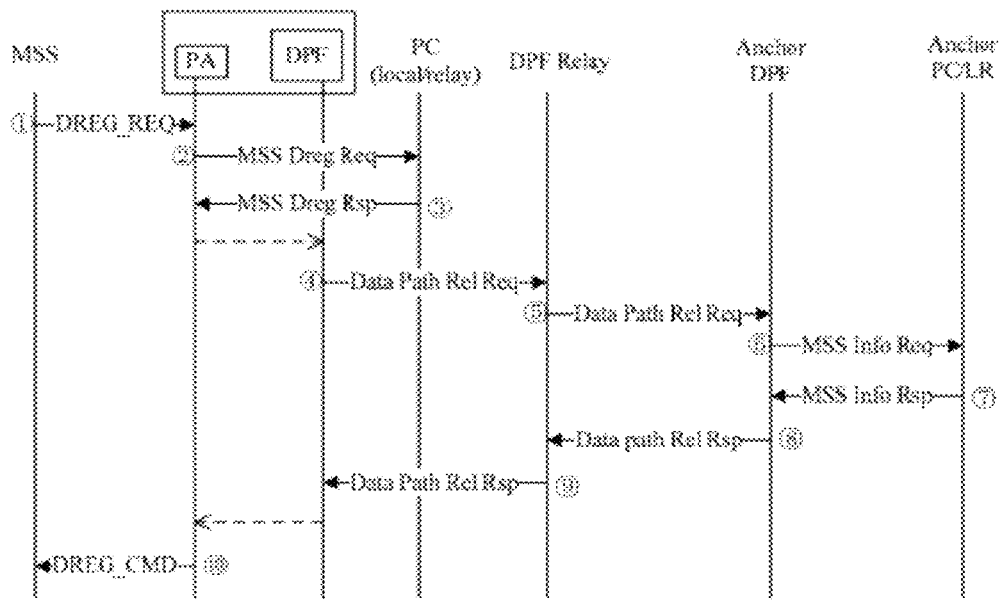
FIG. 2 shows the process of entering the idle mode initiated by a MSS.
Figure 3:
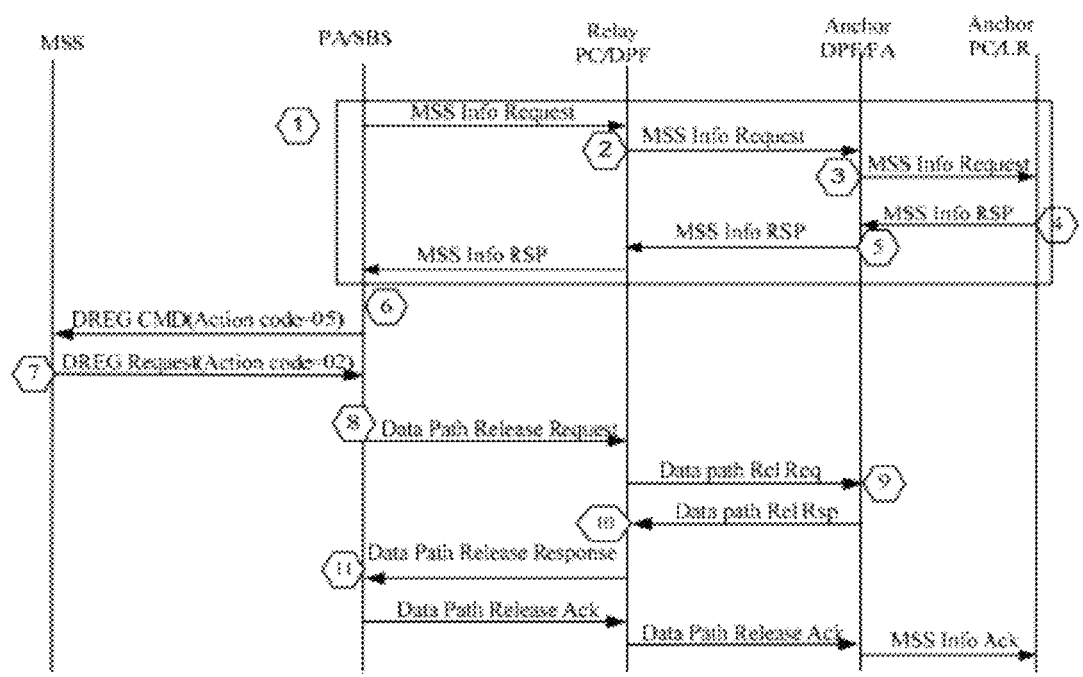
FIG. 3 shows the process of a MSS entering the idle mode initiated by a network, according to an embodiment of the present invention.

Scenario 1: FIG. 3 shows the process of a MSS entering the idle mode initiated by a network side according to a first embodiment of the present invention. As shown in FIG. 3, the process of includes the following steps:

(1) When deciding to let the MSS enter the idle mode, the PA/SBS sends a MSS Info Req message to the relay PC, with the message carrying the following information: indication of the MSS entering the idle mode, MSS ID, Idle Mode Retain Information (indicating the information to be retained in the idle mode), BS ID, anchor DPF/FA ID, anchor authenticator ID, and so on; "/" in the PA/SBS shown in FIG. 3 means that the PA and the SBS are located in the same physical NE or bound together; the "/" hereinafter has the same meaning;

(2) After receiving the message, the relay specifies an anchor PC ID for the MSS, allocates the recommended paging parameters (for example, PG ID, Paging_CYCLE, Paging_OFFSET, PC ID), and then sends the message to the anchor DPF/FA, with the recommended paging parameters added into the message;

(3) After receiving the message, the anchor DPF/FA stores the corresponding information, and sends a MSS Info Req message to the anchor PC specified in the message. The MSS Info Req message carries the MSS ID, Idle Mode Retain Information, BS ID, recommended paging parameters, Service Flow ID (SF ID), and anchor authenticator ID, which are required for the MSS to enter the idle mode;

(4) After receiving the MSS Info Req message, the anchor PC knows that the MSS is requested to enter the idle mode according to the content of the message. At this time, the anchor PC contacts the anchor authenticator to verify whether the MSS is allowed to enter the idle mode. If the verification result allows the MSS to enter the idle mode, the anchor PC will reallocate the paging parameters, according to the specific conditions (for example, the requirements on setting the parameter), and reply with a MSS Info Rsp message. The message carries a MSS ID, the actual paging parameters (including selected PG ID, Paging Cycle, Paging Offset), PC ID, and Idle mode authorization indication. Meanwhile, the anchor PC requires the LR to retain the information on the MSS;

(5) After receiving the MSS Info Rsp, the FA replies with a MSS Info Rsp message to the relay PC if the idle mode authorization indication allows the MSS to enter the idle mode. The message carries a MSS ID, the actual paging parameters, a PG ID, a PC ID, an idle mode authorization indication, and so on. After receiving the message, the relay PC forwards the message to the PA/SBS;

(6) After the PA/SBS receives the message, if the idle mode authorization indication allows the MSS to enter the idle mode, the PA/SBS sends a DREG_CMD message to the MSS from the air interface. The message carries an action code "0x05" (which instructs the MSS to enter the idle mode directly) and the parameter information is specified in the 802.16e protocol. Meanwhile, the PA/SBS starts the resource retaining timer;

(7) After receiving the message, the MSS replies with a DREG_REQ message to the SBS. The message carries an action code "0x02", indicating that the MSS enters the idle mode successfully, and may be in the format specified by the 802.16e protocol. The MSS clears the information related to the link and the session, and enters the idle mode;

(8) After the PA/SBS receives the DREG_REQ message from the MSS, it indicates that the MSS enters the idle mode successfully. Therefore, the PA/SBS sends a Data Path Rel Req message to the relay DPF, requesting to release the data path and connection related to this MSS. The message carries the information required for the MSS to enter the idle mode;

(9) The relay DPF forwards the message to the anchor DPF/FA;

(10) The anchor DPF/FA responds to the request message, releases the data path and replies with a Data Path Rel Rsp message to the relay DPF; and

(11) After receiving the Data Path Rel Rsp message forwarded by the relay DPF, the PA/SBS confirms success of entering the idle mode. Through a relay DPF, the PA/SBS replies with a Data Path Rel Ack message to the FA, indicating that the MSS enters the idle mode successfully. The relay DPF notifies the relay PC to delete the information on the MSS. Meanwhile, the FA sends a MSS Info Ack message to the anchor PC, confirming completion of the MSS entering the idle mode. The anchor PC finally finishes data update in the LR. Further, the anchor PC needs to notify the anchor authenticator to update and retain the information on the MSS idle state, including the anchor PC ID, anchor DPF ID, and security context information.

When the resource retaining timer times out, the SBS deletes the information on the local MSS.

It should be noted that the relay PC is optional in the foregoing step. If the relay PC does not exist, the PA/SBS will communicate with the FA directly.

Figure 4:
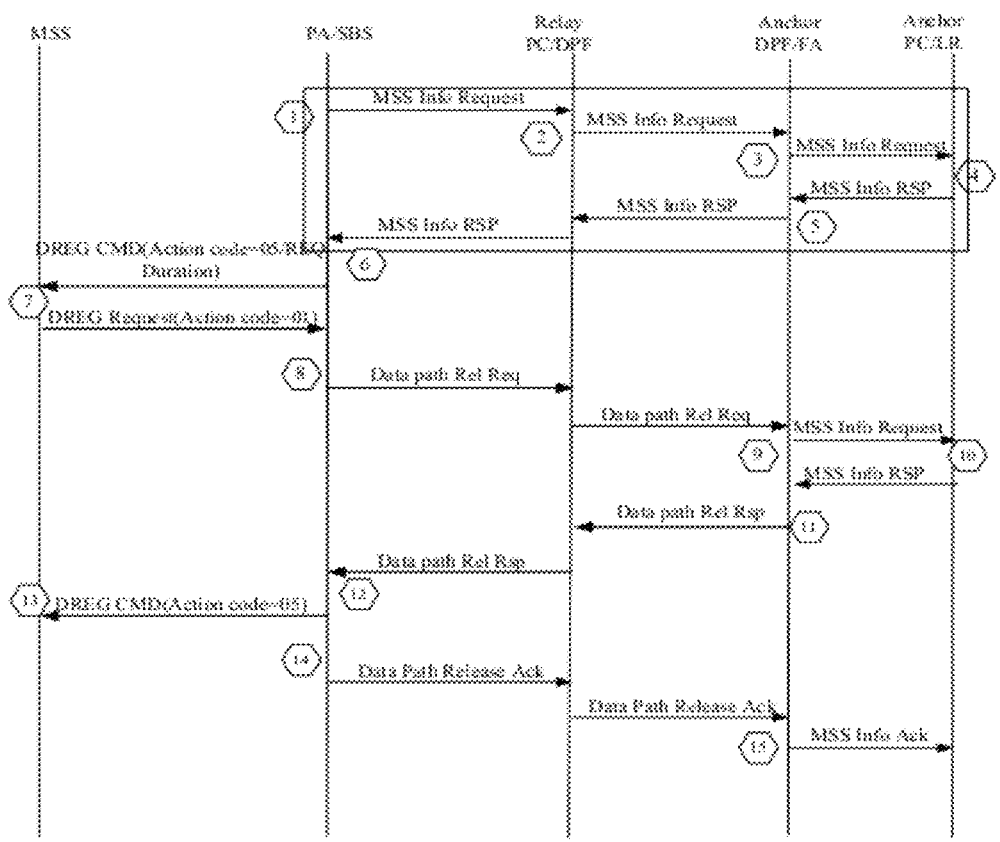
FIG. 4 shows the process of a MSS entering the idle mode initiated by a network, according to another embodiment of the present invention.

What is described below is a scenario that the MSS does not enter the idle mode until a period of time expires after the network side sends a request of enabling the MSS to enter the idle mode. As shown in FIG. 4, the process is as follows:

Steps (1)-(5) are the same as the counterpart in the foregoing embodiment, except that in the process, any of the PA/SBS, relay PC/DPF, anchor DPF/FA and anchor PC/LR can decide whether to require the MSS to send a DREQ_Request message to enter the idle mode after expiry of a REQ_Duration according to the actual conditions;

(6) After the PA/SBS receives the message, the PA/SBS sends a DREG_CMD message to the MSS from the air interface, if the idle mode authorization indication allows the MSS to enter the idle mode. The message carries an action code "0×05" (which instructs the MSS to enter the idle mode) and the REQ_Duration parameter. The DREG_CMD message may adopt the format specified in the 802.16e protocol;

(7) After receiving the message, the MSS replies with a DREG_REQ message to the SBS after expiry of a duration indicated by the REQ_Duration. The message carries an action code "0×01", indicating that the MSS will enter the idle mode. The message may adopt the format specified by the 802.16e protocol. The MSS is ready to enter the idle mode;

(8) After receiving the message, the PA/SBS sends a Data Path Rel Req message to the relay DPF on the MSS link through the DPF entity, requesting to release the link of this MSS. The message carries MSS ID, Idle Mode Retain Information, BS ID, recommended paging parameters (for example, PG ID, Paging Cycle, Paging Offset, PC ID), Access Service Network Data Path Function ID (ASN-DPF ID), and authenticator ID, which are required for the MSS to enter the idle mode. Some parameters in the message are obtained and stored in Steps (1)-(5). The relay DPF on the link forwards the Data Path Rel Req message to the anchor DPF (namely, the DPF that is located together with the FA);

(9) After receiving the message, the anchor DPF/FA stores the corresponding information, and sends a MSS Info Req message to the anchor PC specified in the message. The MSS Info Req message carries the MSS ID, Idle Mode Retain Information, BS ID, recommended paging parameters, Service Flow ID (SF ID), and anchor authenticator ID, which are required for the MSS to enter the idle mode;

(10) After receiving the MSS Info Req message, the anchor PC knows that the MSS requests to enter the idle mode, according to the content of the message. Since, in Step (4), it is already verified whether to allow the MSS to enter the idle mode, the anchor PC does not perform such verification again. The anchor PC may select the paging parameters recommended by the local PC, or reallocate the paging parameters again, according to the specific conditions and reply with a MSS Info Rsp message. The message carries a MSS ID, the actual paging parameters (including selected PG ID, Paging Cycle, Paging Offset), PC ID, and an idle mode authorization indication. Meanwhile, the anchor PC requires the LR to retain the information on the MSS;

(11) After receiving the MSS Info Rsp, the FA stores the corresponding information such as PC ID, and replies with a Data Path Rel Rsp message to the relay PC. The response message carries a MSS ID, the actual paging parameters, a PG ID, a PC ID, and so on. The relay PC on the link forwards the message to the PA/SBS;

(12) After receiving the Data Path Rel Rsp, the SBS confirms that the MSS enters the idle mode successfully, and replies, from the air interface, a DREG_CMD message to the MSS. The message carries an action code "0×05". Meanwhile, the PA/SBS starts the resource retaining timer;

Generally, the resource retaining timer must be started, after the SBS sends a REG CMD message (except that the message carries REQ_Duration). The information on the local MSS will be deleted unconditionally when the resource retaining timer times out. If the REG CMD message carries a REQ_Duration, the resource retaining timer can also be started, but the timer needs to be restarted in this step;

(13) After receiving the message, the MSS deletes information related to the connection and the session; and

(14) Through a relay PC, the PA/SBS replies with a Data Path Rel Ack message to the FA, indicating that the MSS enters the idle mode successfully. The relay PC deletes the information on the MSS. Meanwhile, the FA sends a MSS Info Ack message to the anchor PC, confirming completion of the MSS entering the idle mode. The anchor PC finally finishes data update in the LR. Further, the anchor PC needs to notify the anchor authenticator to update and retain the information on the MSS idle state, including the anchor PC ID, anchor DPF ID, and security context information. Upon expiry of the resource retaining timer, the PA/BS deletes the information on the local MSS.

In this embodiment, the network requires the MSS to send a request of entering the idle mode after waiting for a REQ_Duration. Therefore, in Steps (1)-(5), the FA or relay PC replies to the PA/BS with a MSS Info Rsp message directly, indicating the waiting time of REQ_Duration. The PA/BS replies to the MSS with a DREG_CMD message. The message carries the REQ_Duration parameter and the Action Code "0×05". After a REQ_Duration expires, the MSS sends a request of entering the idle mode again. Namely, the actions executed by the FA and the anchor PC can be omitted. If the relay PC or the FA replies to the PA/SBS directly with a MSS Info Rsp message, in Step (10) it is needed to verify whether the MSS is allowed to enter the idle mode.

In the process shown in FIG. 4, the process of storing the MSS context information into the anchor PC is synchronous to the process of releasing the data path.

Figure 5:
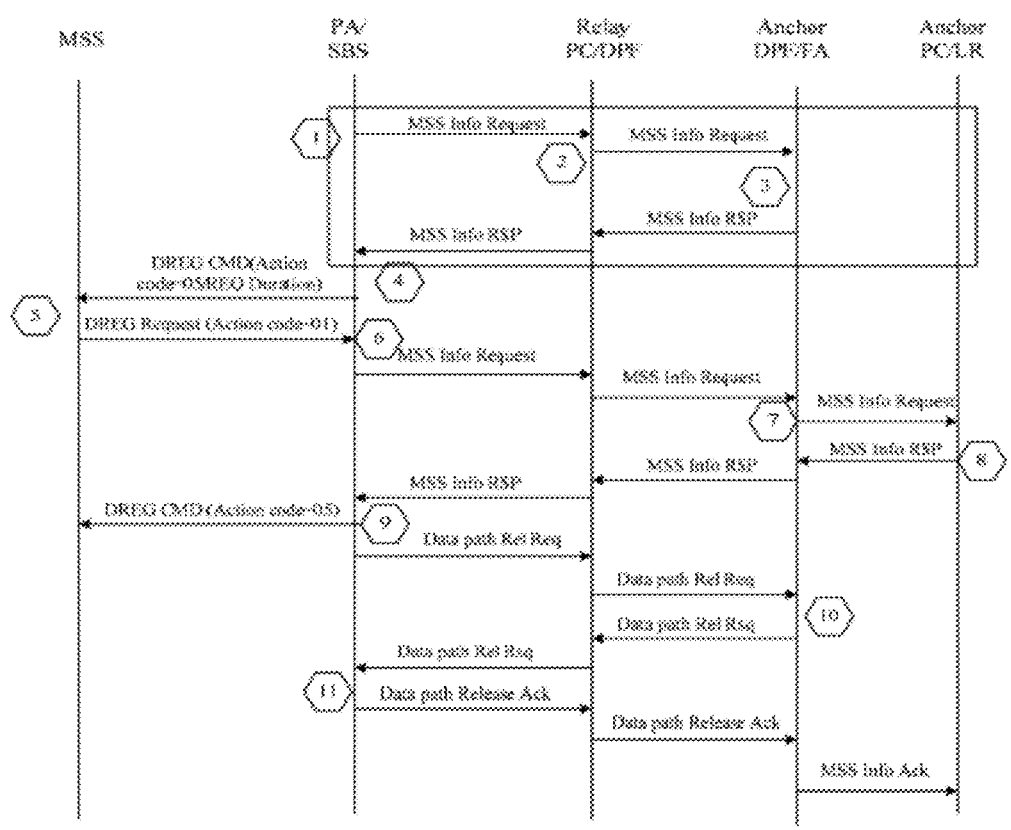
FIG. 5 shows another process of a MSS entering the idle mode initiated by a network, according to another embodiment of the present invention.

An alternative process of this embodiment is shown in FIG. 5. Unlike the preceding process, this process separates the transfer of the MSS information from the release of the data path; and the MSS information and paging-related parameters are transferred through MSS Info Req/MSS Info Rsp messages. The process is briefly described below:

Steps (1)-(3) are the same as the counterpart of the preceding embodiment. The network side decides whether the MSS will send request of entering the idle mode only after expiry of a REQ_Duration according to the actual conditions. If so, the corresponding MSS Info Req message or MSS Info Rsp message will carry the REQ_Duration parameter;

(4) After receiving the message, the PA/SBS sends a DREG_CMD message to the MSS. The message carries an action code "0x05" and a REQ_Duration parameter, and may adopt the format specified by the 802.16e protocol;

(5) After receiving the message, the MSS replies with a DREG_REQ message to the SBS after expiry of a duration indicated by the REQ_Duration. The message carries an action code "0x01", indicating that the MSS will enter the idle mode. The message may adopt the format specified by the 802.16e protocol. The MSS is ready to enter the idle mode;

(6) After receiving the DREG_REQ message from the MSS, the PA/SBS sends a MSS Info Req message to the corresponding relay PC, requesting to determine whether the MSS is allowed to enter the idle mode;

(7) After receiving the message, the relay PC allocates information to the MSS, including: PC ID, paging parameters, MSS ID carried in the message, Idle Mode Retain Information, BS ID, ASN-DPF ID, and anchor authenticator ID; and sends the information to the anchor PC through an FA by means of a MSS Info Req message;

(8) After receiving the MSS Info Req message, the anchor PC knows that the MSS requests to enter the idle mode, according to the content of the message. At this time, the anchor PC contacts the anchor authenticator to verify whether the MSS is allowed to enter the idle mode. If the verification result allows the MSS to enter the idle mode, the anchor PC will reallocate the paging parameters, according to the specific conditions (for example, the requirements on setting the parameter), and reply with a MSS Info Rsp message to the PA/SBS. Meanwhile, the anchor PC requires the LR to retain the information on the MSS;

(9) After receiving the MSS Info Rsp message, the PA/SBS replies to the MSS with a DREG_CMD message, starts the resource retaining timer, and sends a Data Path Rel Req to the relay DPF on the MSS link. The Data Path Rel Req carries: MSS ID, actual paging parameters (selected PG ID, paging cycle, paging offset, and PC ID), and idle mode authorization indication;

(10) The relay DPF on the link forwards the Data Path Rel Req message to the anchor DPF/FA. The anchor DPF/FA responds to the request message, releases the data path and replies with a Data Path Rel Rsp message to the PA/SBS; and

(11) After receiving the Data Path Rel Rsp message, the PA/SBS confirms success of entering the idle mode. Through a relay DPF, the PA/SBS replies with a Data Path Rel Ack message to the FA, indicating that the MSS enters the idle mode successfully. The relay PC will delete the information on the MSS. Meanwhile, the FA sends a MSS Info Ack message to the anchor PC, confirming completion of the MSS entering the idle mode. The anchor PC finally finishes data update in the LR. Upon expiry of the resource retaining timer, the PA/SBS deletes the information on the local MSS.

The process shown in FIG. 5 can implement the functions of the process shown in FIG. 4.

The practical application also involves another scenario: if multiple hosts are attached to a MSS, when the network is initialized to enable the MSS to enter the idle mode, the MSS may need to wait for a CMD_Duration before entering the idle mode due to interaction with the host. After expiry of the CMD_Duration, the process of entering the idle mode will be initiated again. The detailed procedure is as follows:

a. The first step and the preceding operations are the same as the counterpart of the foregoing two embodiments;

b. In the second step, the MSS decides to enter the idle mode only after expiry of a CMD_Duration, according to the actual conditions, and hence replies with a DREG_REQ message, which carries an action code "0x02" and the CMD_Duration information. After receiving this message, the network-side SBS stops the pre-set resource retaining timer if such a timer is set previously when the SBS sends a DREG_CMD to the MSS; and waits for the MSS to send a request of entering the idle mode; and c. After a CMD_Duration expires, the MSS sends a new DREG_REQ, requesting to enter the idle mode. The subsequent steps are the same as the counterpart steps in the foregoing embodiment.

The CMD_Duration parameter is newly added in the air interface message, DREG_REQ message, in the prior art, and is designed to notify the network to wait for a CMD_Duration before the MSS enters the idle mode.

Figure 6:
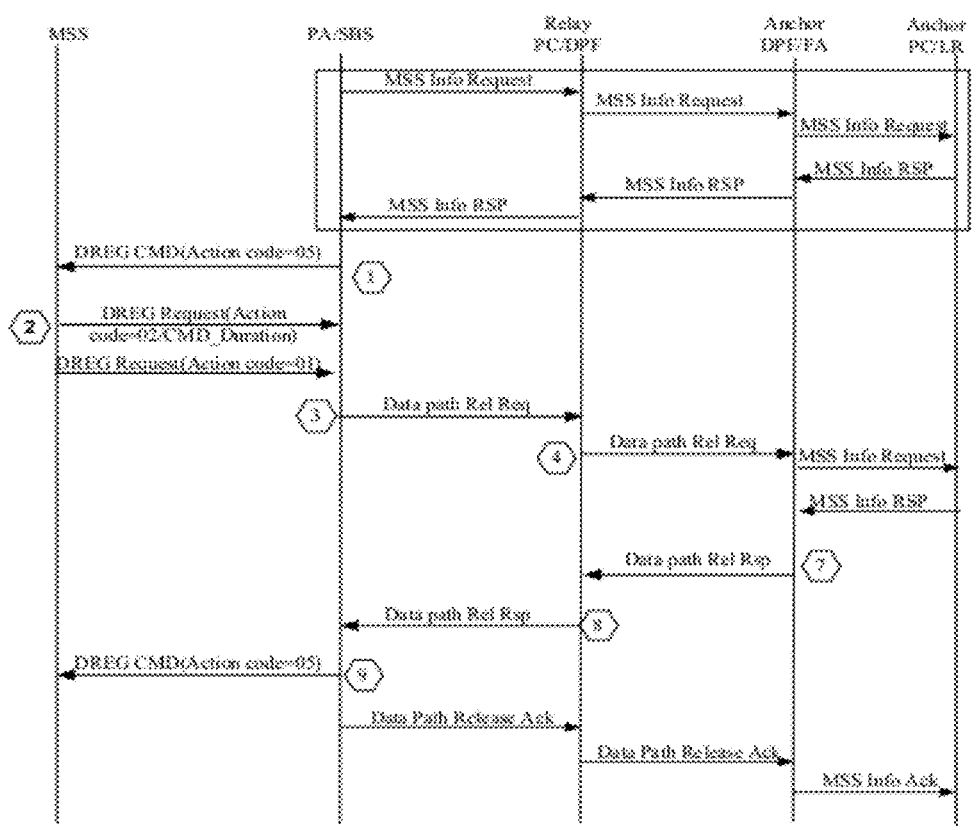
FIG. 6 shows the process of a MSS entering the idle mode initiated by a network, according to another embodiment of the present invention.
Figure 7:
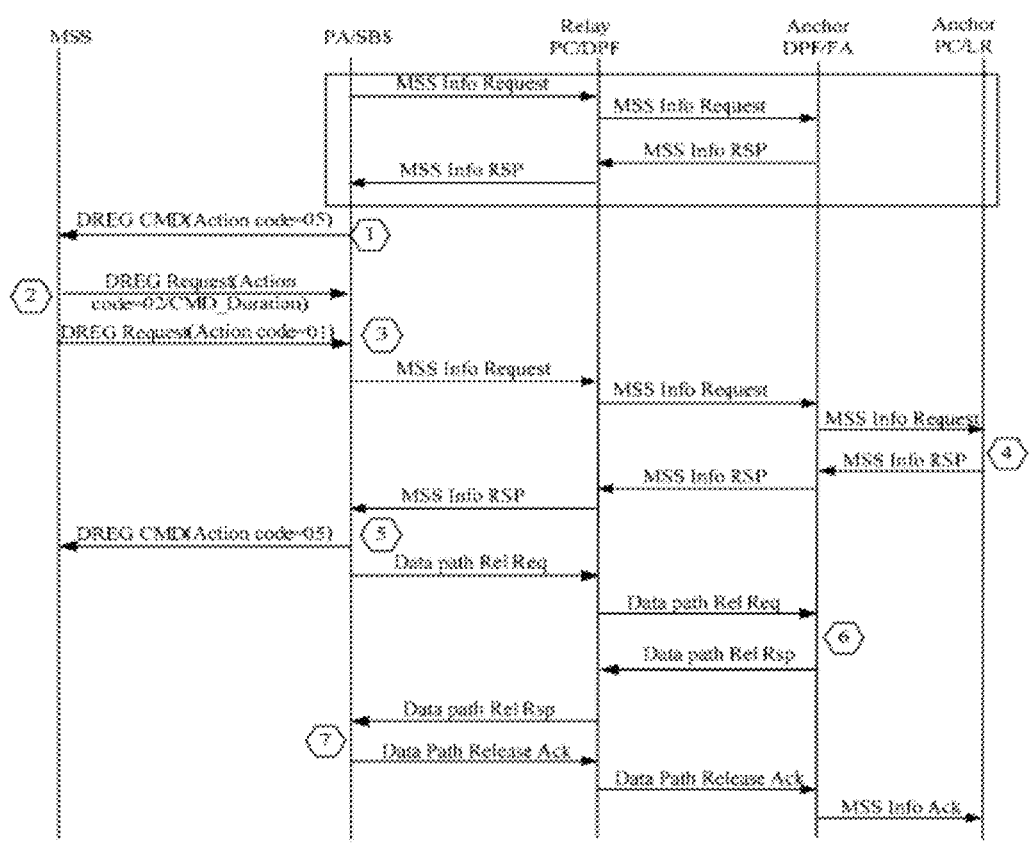
FIG. 7 shows another process of a MSS entering the idle mode initiated by a network, according to another embodiment of the present invention.

An alternative process of this embodiment is shown in FIG. 7. Unlike the process shown in FIG. 6, this process separates the transfer of MSS information from the release of the data path; and the MSS information and paging-related parameters are transferred through MSS Info Req/MSS Info Rsp messages. The functions implemented by the process are the same.

It should be noted that the relay PC is optional in the foregoing step. If the relay PC does not exist, the PA/SBS will communicate with the FA directly.

In the foregoing embodiments, the process of the network enabling the MSS to enter the idle mode involves several relevant parameters such as Idle Mode Timeout, Paging Interval Length, and Paging Cycle Req. The DREG_REQ message of the MSS may carry one or more parameters, so that the parameters are transferred and stored into the anchor PC.

Regarding the Idle Mode Timeout parameter, after the MSS enters the idle mode, both the MSS and the PC will start an idle mode timer at the MSS side, upon expiry of which the MSS will initiate location update; or, in the PC, start an idle mode system timer, upon expiry of which the PC will initiate paging to the MSS to require location update if the PC receives no location update request from the MSS, or will delete the context information of the MSS directly if the PC believes that the MSS is off network. The Idle Mode Timeout parameter is used by the MSS and the PC to set the foregoing timers, and is negotiated by the MSS and the network side in the process of registering the MSS onto the network.

In the process of the MSS entering the idle mode, the Idle Mode Timeout parameter needs to be transferred and stored in the anchor PC for the purpose of setting the idle mode system timer. If the anchor PC is migrated when the MSS is in the idle mode, the parameter needs to be transferred to the new anchor PC. For that purpose, the Idle Mode Timeout parameter needs to be transferred to the current network side during the handover, including the target BS. This parameter is negotiated in the process of registering the MSS onto the network; and the BS or serving network that serves the MSS when the MSS accesses the network may be different from the BS or serving network that serves the MSS when the MSS enters the idle mode later. Therefore, this parameter must be transferred together with the MSS context during the handover of the MSS.

Moreover, this parameter can also be configured by the network side directly, and carried in the DREG_REQ message to the MSS, without being negotiated in the process of registering the MSS onto the network.

Regarding the Paging Interval Length parameter, according to the paging cycle and the paging offset, it is practicable to calculate the specific radio frame (Nframe) after which the BS begins to send paging messages. The Paging Interval Length refers to the number of continuous frames (N) starting from Nframe, where N is not Nframe. Namely, the MSS can receive the paging messages in N continuous frames starting from Nframe after the paging message occurs. The Paging Interval Length parameter is also determined through negotiation with the network side in the process of registering the MSS onto the network.

In the process which the MSS entering the idle mode, the Paging Interval Length parameter needs to be transferred and stored in the anchor PC; and needs to be transferred to the BS when the anchor PC initiates paging for the purpose of determining the scheduling policy of sending the paging message. If the anchor PC is migrated when the MSS is in the idle mode, the parameter needs to be transferred to the current network side, including the target BS. This parameter is negotiated in the process of registering the MSS onto the network; and the BS or serving network that serves the MSS when the MSS accesses the network may be different from the BS or serving network that serves the MSS when the MSS enters the idle mode later. Therefore, this parameter must be transferred, together with the MSS context during the handover of the MSS.

Regarding the Paging Cycle Req parameter, it is carried in the DREG_REQ message in the process of the MSS entering the idle mode, and serves as a basis for the network side to determine the paging cycle for this MSS. Therefore, in the process of the MSS entering the idle mode, this parameter needs to be carried to the PC.

Regarding the MAC Hash Skip Threshold parameter, it is a threshold of a number of continuously sent paging messages (MOB-PAG-ADV). If no paging message specific to the MSS exists among a set number (threshold) of paging messages that are sent continuously, the PC or PA/BS will send a paging message specific to the MSS. Therefore, the MAC Hash Skip Threshold parameter needs to be transferred and saved into the PC so that the PC or PA/BS can handle accordingly in the case that the conditions are fulfilled. This parameter may be determined through negotiation with the network side in the process of registering the MSS onto the network, carried in the MSS Info Req message or the DREG_REQ message, and hence transferred and stored into the relay PC or anchor PC.

The Idle Mode Timeout, Paging Interval Length, Paging Cycle Req, and MAC Hash Skip Threshold parameters mentioned above can be configured by the network side uniformly, so that they will vary with the terminal. In this case, they are not necessarily transferred in the process of the MSS entering the idle mode in an embodiment of the present invention.

Regarding the Paging Preference parameter, every service flow created by the MSS has a Paging Preference parameter. If this parameter is set, it means that the network can generate a paging message to page the MSS after the MSS enters the idle mode if the service flow has an incoming downlink packet; if this parameter is not set, the network will not generate a paging message to page the MSS when the service flow has an incoming downlink packet; when a downlink packet of the MSS arrives but finds no corresponding service flow, the anchor PC may initiate or may not initiate the paging to the MSS, according to the presetting.

After the MSS enters the idle mode, the network will retain only the service flow information whose Paging Preference is set to 1, if the 7th bit of the Idle Mode Retain Information parameter is set to 1. For other service flow information the anchor DPF/FA will delete the service flow information which is not to be retained, and notify the Service Flow Authorization (SFA) entity and the Policy Function (PF) entity to delete and release the service flows, after the MSS enters the idle mode. The information stored in the anchor PC/LR may include the service flow information of the MSS for which a Paging Preference parameter is set, and exclude the service flow information for which no Paging Preference parameter is set.

Like in the foregoing embodiments, the anchor PC must record the following information into the context carried in the request of entering the idle mode sent by the MSS: ID of the current anchor DPF/FA (which may be IP address of the ASN GW that contains the anchor DPF/FA), and the anchor authenticator ID.

The anchor authenticator of the MSS must record the anchor PC ID which exists when the MSS is in the idle mode. The anchor PC ID may be recorded when the anchor PC consults the anchor authenticator whether the MSS can enter the idle mode; or the anchor PC notifies the anchor PC ID to the anchor authenticator of the MSS after confirming that the MSS enters the idle mode.

Moreover, the anchor DPF/FA records the anchor PC ID of the MSS. For this purpose, the anchor PC may notify the anchor PC ID to the anchor DPF/FA of the MSS, after confirming that the MSS enters the idle mode.

Although the WiMAX system is used as an example in describing the technical solution under the present invention, the technical solution under the present invention is not limited to the WiMAX system, but is applicable to other wireless MANs such as 802.20-based wireless MANs.

As analyzed above, the method under the present invention enables the network side to send a request of getting the MSS into the idle mode, thus standardizing and perfecting the process of the MSS entering the idle mode and making the process more stable.

The embodiments described above are only preferred embodiments of the invention and are not intended for limiting the invention. Any modification, equivalent substitution, and improvement without departing from the spirit and principle of this invention shall be covered in the protection scope of the invention.

What is claimed is:

1. A computer readable medium at a network, comprising a computer program stored in a non-transitory medium that, when executed by a digital processor, causes the processor to perform operations comprising:
  determining that a Mobile Subscribe Station (MSS) should enter an idle mode;
  sending a first MSS information (Info) Request message to a relay paging controller (PC), to enable the relay PC to specify an anchor PC identification (ID) for the MSS, to allocate recommended paging parameters, and to send a second MSS Info Request message which is the first MSS Info Request message combined with the recommended paging parameters, to an anchor Data Path Function (DPF)/foreign agent (FA), which will send the second MSS Info Request message to an anchor PC corresponding to the anchor PC ID;
  receiving an MSS Info Response message, that is generated by and sent from the anchor PC, which has verified through an anchor authenticator that the MSS is allowed to enter the idle mode, according to the second MSS Info Request message;
  upon receiving the MSS Info Response message, sending, a deregistration command (DREG_CMD) message to the MSS;
  receiving, a deregistration request (DREG_REQ) message from the MSS indicating that the MSS has entered the idle mode; and releasing, a link of the MSS after receiving the DREG_REQ message to make the anchor PC/a location register (LR) update data in the LR.

2. The computer readable medium of claim 1, wherein:
parameters carried in the first MSS Info Request message or the DREG_REQ message comprise an Idle Mode Timeout parameter, so that the anchor PC can start the Idle Mode System Timer, according to the Idle Mode Timeout parameter after the MSS enters the idle mode, and initiate paging to the MSS or delete context information of the MSS directly upon expiry of the Idle Mode System timer, if the anchor PC receives no location update request from the MSS.

3. The computer readable medium of claim 1, wherein:
parameters carried in the first MSS Info Request message or the DREG_REQ message comprise a Paging Interval Length parameter, which is transferred and stored in the relay PC or the anchor PC/LR.

4. The computer readable medium of claim 1, wherein:
parameters carried in the first MSS Info Request message or the DREG_REQ message comprise a Paging Cycle Request parameter, which is transferred and stored in the relay PC or the anchor PC/LR.

5. The computer readable medium of claim 1, wherein:
parameters carried in the first MSS Info Request message or the DREG_REQ message comprise a medium access controller (MAC) Hash Skip Threshold parameter, which is transferred and stored in the relay PC or the anchor PC/LR.

6. The computer readable medium of claim 3, wherein the operations further comprise:
achieving the Paging Interval Length parameter when the anchor PC initiates paging to the MSS; and
sending a paging broadcast message in a paging interval.

7. The computer readable medium of claim 1, the operations further comprise:
starting, a resource retaining timer, so that information on the MSS will be deleted upon expiry of the resource retaining timer.

8. A method for enabling a Mobile Subscribe Station (MSS) to enter an idle mode in a wireless Metropolitan Area Network (MAN) by a network side, comprising:
determining, by a paging agent (PA)/a base station (BS) in the network side, that the MSS should enter the idle mode;
sending a first MSS information (Info) Request message to a relay paging controller (PC), to enable the relay PC to specify an anchor PC identification (ID) for the MSS, to allocate recommended paging parameters and to send a second MSS Info Request message which is the first MSS Info Request message combined with the recommended paging parameters, to an anchor Data Path Function (DPF)/foreign agent (FA), which will send the second MSS Info Request message to an anchor PC corresponding to the anchor PC ID;
receiving an MSS Info Response message, that is generated by and sent from the anchor PC, which has verified through an anchor authenticator that the MSS is allowed to enter the idle mode, according to the second MSS Info Request message;
upon receiving the MSS Info Response message, sending to the MSS, a deregistration command (DREG_CMD) message;
receiving, from the MSS, a deregistration request (DREG_REQ) message indicating that the MSS has entered the idle mode to make the PA/BS release a link of the MSS and further make the anchor PC/a location register (LR) update data in the LR.

9. The method of claim 8, wherein if the network side requires the MSS to enter the idle mode after waiting for a duration, the DREG_CMD message will carry a request duration (REQ_Duration) parameter which instructs the MSS to send the DREG_REQ message requesting to enter the idle mode after expiry of the duration indicated by the REQ_Duration parameter; and the method further comprises:
receiving from the MSS, the DREG_REQ message after the expiry of the indicated duration.

10. The method of claim 8, wherein the receiving, from the MSS, the DREG_REQ message indicating that the MSS has entered the idle mode, comprises:
receiving from the MSS, a first DREG_REQ message which carries a request duration (REQ_Duration) parameter if the MSS decides to request to enter the idle mode only after waiting for a duration;
receiving from the MSS, a second DREG_REQ message after expiry of the duration indicated by the REQ_duration in order to request to enter the idle mode.

11. A base station (BS) at a network side, comprising:
a processor, a receiver and a sender, wherein,
the processor is configured to determine that a Mobile Subscribe Station (MSS) should enter the idle mode;
the sender is configured to send a first MSS information (Info) Request message to a relay paging controller (PC), to enable the relay PC to specify an anchor PC identification (ID) for the MSS, to allocate recommended paging parameters, and to send a second MSS Info Request message which is the first MSS Info Request message combined with the recommended paging parameters, to an anchor Data Path Function (DPF)/foreign agent (FA), which will send the second MSS Info Request message to an anchor PC corresponding to the anchor PC ID;
the receiver is configured to receive an MSS Info Response message, that is generated by and sent from the anchor PC, which has verified through an anchor authenticator that the MSS is allowed to enter the idle mode, according to the second MSS Info Request message;
upon the receiver receiving the MSS Info Response message, the sender is further configured to send to the MSS, a deregistration command (DREG_CMD) message;
the receiver is further configured to receive, from the MSS, a deregistration request (DREG_REQ) message indicating that the MSS has entered the idle mode to make the BS release a link of the MSS and further make the anchor PC/a location register (LR) update data in the LR.

12. The method of claim 11, wherein if the network side requires the MSS to enter the idle mode after waiting for a duration, the DREG_CMD message will carry a request_duration (REQ_Duration) parameter which instructs the MSS to send the DREG_REQ message requesting to enter the idle mode after expiry of the duration indicated by the REQ_Duration parameter; and the receiver is further configured to:
receiving from the MSS, the DREG_REQ message after the expiry of the indicated duration.

13. The method of claim 11, wherein the receiver receiving from the MSS, the DREG_REQ message indicating that the MSS has entered the idle mode, comprises:
receiving from the MSS, a first DREG_REQ message which carries a request_duration (REQ_Duration) parameter if the MSS decides to request to enter the idle mode only after waiting for a duration;

receiving from the MSS, a second DREG_REQ message after expiry of the duration indicated by the REQ_duration in order to request to enter the idle mode.

\* \* \* \* \*